United States Patent [19]
Yarbrough et al.

[11] Patent Number: 5,399,807
[45] Date of Patent: Mar. 21, 1995

[54] EXPLOSION-PROOF ELECTRICAL APPARATUS AND METHOD OF ASSEMBLY

[75] Inventors: Garrett S. Yarbrough, Chicago, Ill.; John E. Cower, Manlius, N.Y.; Kevin L. Browngardt, Syracuse, N.Y.; Susan M. Orzell, DeRuyter, N.Y.; Robert P. Haytko, Cicero, N.Y.; William G. Wright, Liverpool, N.Y.; Nelson L. Lansing, Bridgeport, N.Y.

[73] Assignee: Cooper Industries, Inc., Houston, Tex.

[21] Appl. No.: 171,441

[22] Filed: Dec. 22, 1993

Related U.S. Application Data

[63] Continuation of Ser. No. 111,880, Aug. 26, 1993, abandoned.

[51] Int. Cl.⁶ .................................................. H02G 3/06
[52] U.S. Cl. .................................. 174/65 R; 285/175; 285/357
[58] Field of Search ................ 174/65 R, 65 SS, 151, 174/152 R; 285/158, 175, 357

[56] References Cited

U.S. PATENT DOCUMENTS

| | | | |
|---|---|---|---|
| 3,761,601 | 9/1973 | Kaesser et al. | 174/52.1 |
| 4,301,325 | 11/1981 | Hutchison | 174/76 |
| 4,329,540 | 5/1983 | Howarth | 174/153 R |
| 4,549,037 | 10/1985 | Bawa et al. | 174/65 SS |
| 4,814,547 | 3/1989 | Riley et al. | 174/65 SS |
| 5,015,804 | 5/1991 | Nattel et al. | 174/65 SS |
| 5,087,795 | 2/1992 | Guginsky | 174/65 SS |

Primary Examiner—Leo P. Picard
Assistant Examiner—David Tone
Attorney, Agent, or Firm—Burns, Doane, Swecker & Mathis

[57] ABSTRACT

An explosion-proof electrical apparatus comprises two enclosures containing electrical devices. The enclosures are physically interconnected by a one-piece or two-piece hollow sleeve member which is screwed into threaded holes of the enclosures. A fitting assembly mounted in the sleeve member comprises a hollow feedthrough bushing screwed into the sleeve member, a hollow feedthrough seal member screwed into the feedthrough bushing, and a plurality of conductors extending through the feedthrough seal member and electrically connected to the electrical devices. The conductors are embedded in sealing compound which occupies the feedthrough seal member. During assembly of the fitting assembly, the feedthrough seal member is positioned within the sleeve, and the feedthrough bushing is screwed along the feedthrough seal member and is simultaneously screwed into the sleeve.

17 Claims, 2 Drawing Sheets

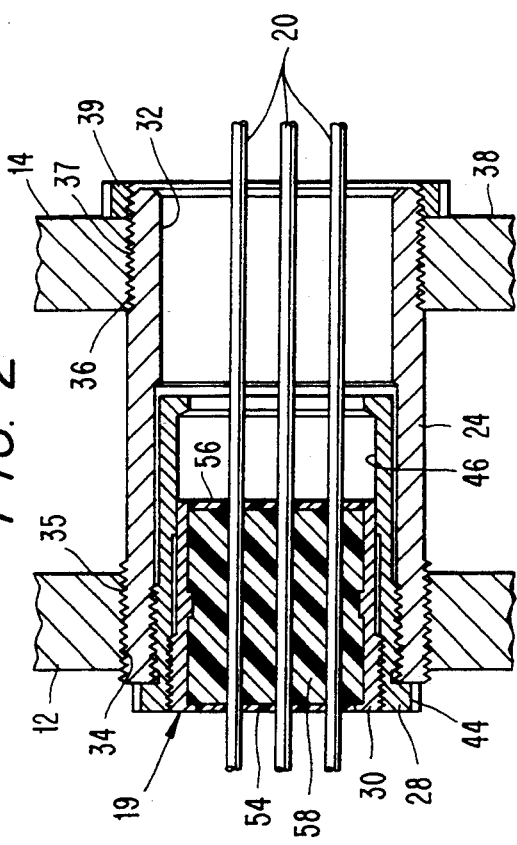
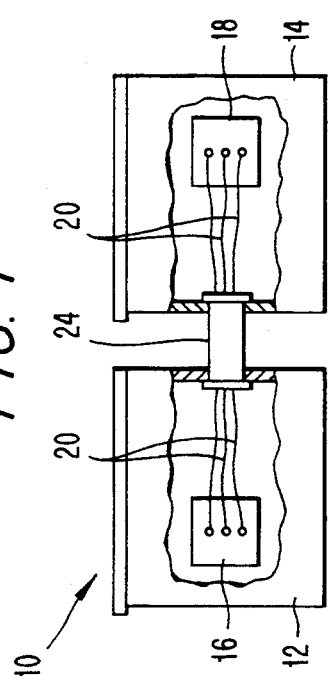
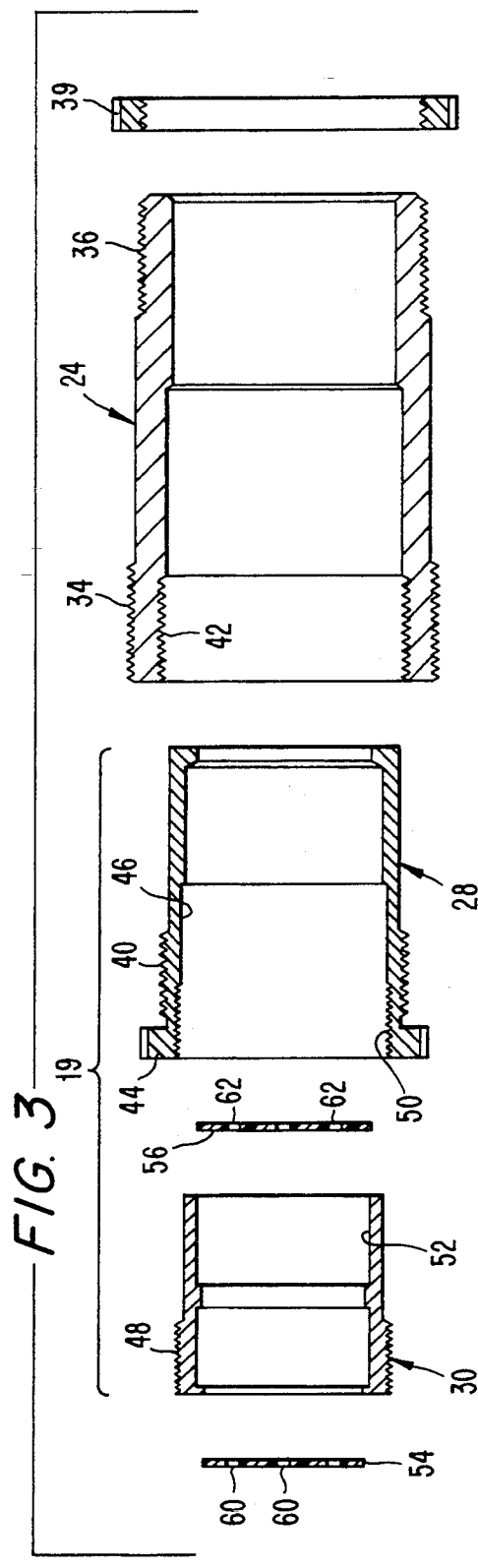

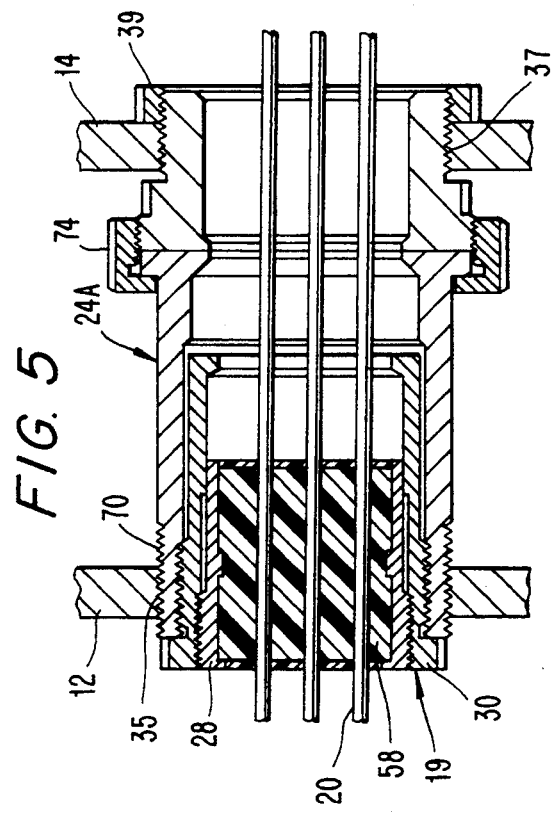
FIG. 4
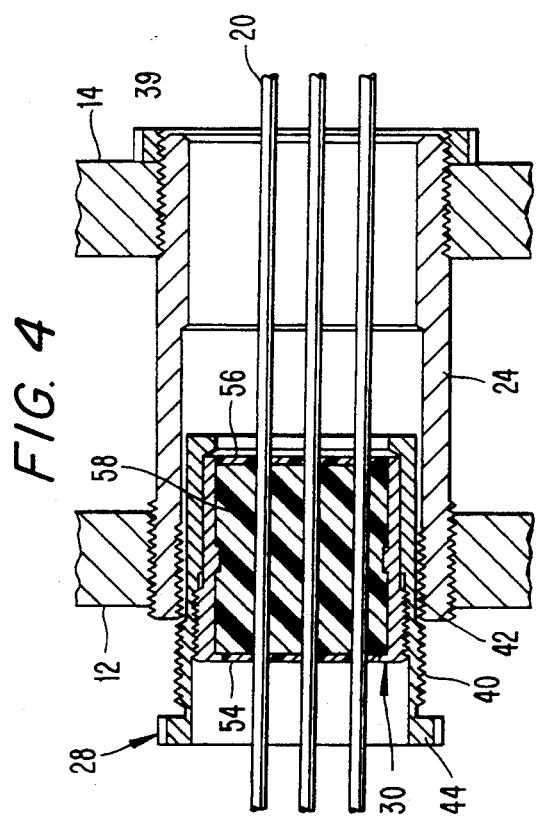
FIG. 5
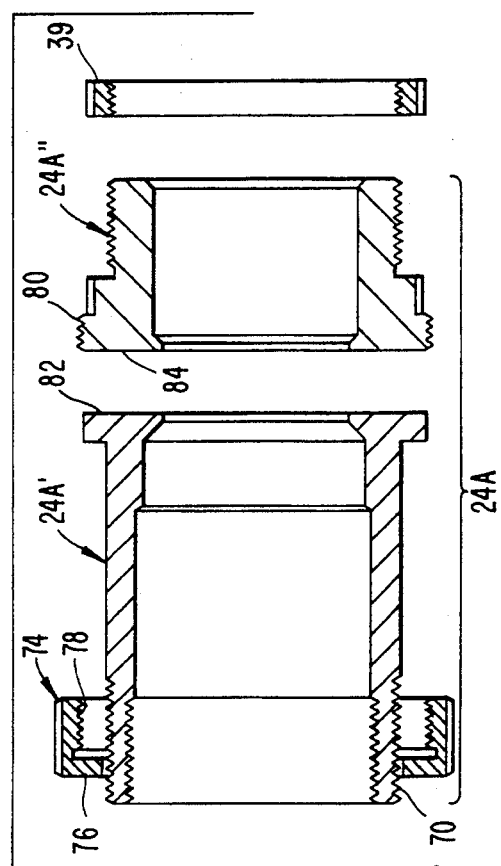
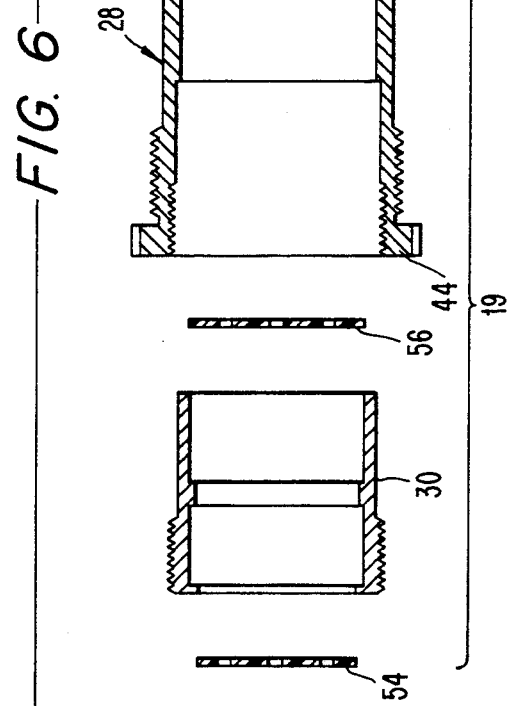
FIG. 6

EXPLOSION-PROOF ELECTRICAL APPARATUS AND METHOD OF ASSEMBLY

This application is a continuation of application Ser. No. 08/111,880, filed Aug. 26, 1993, abandoned.

BACKGROUND OF THE INVENTION

The present invention relates to an explosion-proof electrical apparatus and in particular to a feedthrough fitting assembly for use in such an apparatus, as well as a method for installing same.

In certain electrical apparatus, it is necessary to connect electrical terminals to arc-producing electrical devices such as circuit breakers, switches, relays and meters for example, in a manner isolating the arcs from the surrounding environment. This is conventionally accomplished by positioning the arc-producing devices within respective explosion-proof (flame-proof) enclosures, and running the electrical conductors from one device to another through an explosion-proof fitting mounted on adjacently disposed walls of the enclosures. The fittings contain sealing compound which surrounds the conductors to isolate the surrounding environment from the interiors of the enclosures.

It is desirable to ensure that the fittings are explosion-proof so that the environment surrounding the enclosures is assuredly protected against sparks which might occur within the enclosures. It is also desirable to ensure that each of the enclosures is isolated from any sparks produced in the other enclosure. Up until now, fittings which fulfill that goal have been difficult to install and/or remove.

SUMMARY OF THE INVENTION

The present invention involves an explosion-proof fitting assembly for electrically interconnecting electrical components mounted in first and second adjacently disposed enclosures respectively. The fitting assembly comprises a feedthrough bushing having an external screw thread adapted to secure the feedthrough bushing with respect to the enclosures. The feedthrough bushing includes a longitudinal through-passage having an internal screw thread. A feedthrough seal member is provided having an external screw thread secured in the internal screw thread of the feedthrough bushing, thereby permitting the feedthrough bushing to move freely longitudinally along the feedthrough seal member. The feedthrough seal member includes a longitudinal through-passage. Electrical conductors extend through the through-passage of the feedthrough seal member and are embedded within sealing compound occupying the through-passage of the feedthrough seal member. The sleeve may comprise a one-piece member, or a multi-section member, with the sections being clamped longitudinally together.

The present invention also relates to an explosion-proof electrical apparatus comprised of first and second adjacently disposed enclosures, electrical devices mounted in respective enclosures, a sleeve threadedly connected into the enclosures, and a feedthrough fitting assembly as described above.

The present invention also relates to a method of installing an explosion-proof fitting assembly for electrically interconnecting two electrical devices disposed, respectively, in two enclosures. Each enclosure has an internally threaded hole which is threadedly connected to a respective end of a hollow sleeve member. The method comprises providing the fitting assembly in the form of a feedthrough seal member threadedly mounted within a feedthrough bushing. The feedthrough seal member carries a plurality of electrical conductors which extend therethrough and which are embedded in sealing compound occupying the feedthrough seal member. The fitting assembly is positioned such that at least a portion of the feedthrough seal member is disposed within the sleeve member, and the conductors extend through the sleeve member. The feedthrough bushing is screwed along the feedthrough seal member while holding the feedthrough seal member stationary to simultaneously screw the feedthrough bushing into the sleeve member.

BRIEF DESCRIPTION OF THE DRAWING

The objects and advantages of the invention will become apparent from the following detailed description of preferred embodiments thereof in connection with the accompanying drawings in which like numerals designate like elements and in which:

FIG. 1 is a schematic side view of a pair of enclosures which are broken away to reveal electrical devices mounted therein, the electrical devices being electrically interconnected by an explosion-proof fitting assembly according to the present invention.

FIG. 2 is a longitudinal sectional view through an installed fitting assembly according to the present invention;

FIG. 3 is an exploded longitudinal sectional view of the fitting assembly and sleeve within which the fitting assembly is mounted;

FIG. 4 is a longitudinal sectional view similar to FIG. 2 depicting a step occurring during installation of the fitting assembly;

FIG. 5 is a view similar to FIG. 2 of a second embodiment of the present invention; and FIG. 6 is a view similar to FIG. 3 of the second embodiment.

DETAILED DESCRIPTION OF PREFERRED EMBODIMENTS OF THE INVENTION

Depicted in FIG. 1 is an electrical installation 10 comprising a pair of relatively fixed enclosures 12, 14 in which are disposed electrical devices 16, 18, respectively. The devices 16, 18 could comprise circuit breakers, switches, relays, terminals and meters, for example. The enclosures are physically interconnected by a connector sleeve 24, and the devices 16, 18 are electrically interconnected by a fitting assembly 19 (see FIGS. 2–6). The fitting assembly 19 comprises a plurality of conductors 20, a feedthrough bushing 28, a feedthrough seal member 30, and a pair of spacer members 54, 56.

The connector sleeve 24 is hollow to define a longitudinal through-passage 32. At its opposite ends, the sleeve 24 is provided with first and second external screw threads 34, 36 respectively, the first thread 34 being of larger diameter than the second thread 36. The threads 34, 36 enable the sleeve 24 to be screwed simultaneously into corresponding screw-threaded holes 35, 37 of the respective enclosures 12, 14 in a left-to-right direction in FIG. 2. The hole 35 is larger than the hole 37 so that the portion of the sleeve which contains the second thread 36 can be freely inserted therethrough in the left-to-right direction. Then, the sleeve is rotated so as to be simultaneously screwed into the holes 35, 37. A nut 39 is then screwed onto the thread 36 and bears against an inside surface 38 of the enclosure 14 to resist rotation of the sleeve 24.

The fitting assembly 19 is mounted within the through-passage 32. This is accomplished by an external screw-thread 40 on the feedthrough bushing 28 which screws into an internal screw thread 42 disposed at a first end of the through-passage 32 of the sleeve 24. A radial outwardly projecting flange 44 of the feedthrough bushing is of polygonal shape, e.g., hexagonal, to be engaged by a tool such as a wrench for rotating the feedthrough bushing 28.

The feedthrough seal member 30 is mounted within a longitudinal through-passage 46 of the feedthrough bushing 28. An external screw thread 48 formed on a first end of the feedthrough seal member 30 is secured to an internal screw thread 50 formed at a first end of the through-passage 46. A longitudinal through-passage 52 formed in the feedthrough seal member 30 accommodates the conductors 20 which pass through the spacer members 54, 56, the latter being mounted in first and second ends, respectively, of the through-passage 52.

A sealing or potting compound 58 occupies the through-passage 52, with the conductors 20 embedded therein to produce an explosion-proof barrier around the conductors. Before the fitting assembly 19 is installed in the sleeve 24, the conductors 20 are mounted in the feedthrough seal member 30 in the following manner. The conductors 20 are placed through the through-passage 52 and through holes 60, 62 formed in the spacer members 54, 56 respectively. That unit is then positioned with its axis oriented vertically, and with either of the spacer members 54, 56 located on the bottom. If the spacer member 56 is located at the bottom of through-passage 52, then the spacer member 54 is lifted off the feedthrough seal member 30 by being slid upwardly along the conductors 20 to expose the through-passage 52. The sealing compound 58 is then poured into the through-passage 52, and the spacer member 54 is lowered back onto the feedthrough seal member 30. The spacer member 56 acts as a dam to contain the sealing compound as it cures (hardens). The spacer members 54, 56 keep the conductors properly spaced apart as that occurs. The feedthrough bushing 28 can be threaded on the feedthrough seal member 30 before or after the mounting of the conductors in the feedthrough seal member 30.

After the sealing compound 58 cures, the thus-formed fitting assembly 19 is manipulated as shown in FIG. 4, with the feedthrough bushing 28 positioned at an extreme left end of the feedthrough seal member 30, with the conductors 20 threaded through the previously-installed sleeve 24, and with the feedthrough seal member 30 disposed within the through-passage 32. While the feedthrough seal member 30 and conductors 20 are held stationary, the feedthrough bushing 28 is rotated so that the thread 40 of the latter is screwed into the thread 42 of the sleeve 24. This occurs until the flange 44 abuts the end of the sleeve 24, as shown in FIG. 2. Final tightening can be performed by a tool such as a wrench which engages the flange 44.

Consequently, the fitting assembly 19 is installed without having to rotate the feedthrough seal member 30 and the conductors 20. It will be appreciated that the fitting assembly 19 contains many conductors (even though only three are depicted), and it would be undesirable to have those conductors whipping around as would be the case if the feedthrough seal member 30 had to be rotated during installation of the fitting assembly 19. If it is desirable to remove the fitting assembly 19, this can be done by reversing the installation procedure.

The screw-threaded joints 34, 36 formed between the sleeve 24 and the enclosures 12, 14 create an effective flame barrier between the enclosures and the surrounding atmosphere. The screw-threaded joint 40, 42 formed between the sleeve 24 and feedthrough bushing 28, and the screw-threaded joint 48, 50 formed between the feedthrough bushing 28 and the feedthrough seal member 30 form effective flame barriers between the two enclosures 12, 14.

The sleeve 24, feedthrough bushing 28, and feedthrough seal member 30 are preferably formed of metal, such as aluminum. The spacer members 54, 56 are preferably formed of a polymeric material, such as polypropylene or Nylon ®, for example.

Depicted in FIGS. 5 and 6 is another preferred explosion-proof apparatus which is identical to the above-described apparatus, except for the construction of the connector sleeve 24A. Components of the apparatus of FIGS. 5–6 which are identical with those of the apparatus of FIGS. 2–4 are provided with the same reference numerals.

The sleeve 24A comprises first and second sleeve sections 24A', 24A''. The first sleeve section 24A' includes an external screw thread 70 which screws into the threaded hole 35 of the enclosure 12, and the second sleeve 24A'' includes an external screw thread 72 which screws into the hole 37 of the other enclosure 14. Thus, the sleeve sections 24A', 24A'' can be installed separately. The first sleeve section 24A' carries a clamping nut or union nut 74 which includes a flange 76 and an internal screw thread 78. Once the two sleeve sections 24A', 24A'' have been installed such that their mutually facing surfaces 82, 84 are in abutting relationship, the clamping nut 74 is screwed onto the thread so that the flange 76 clamps the surfaces 82, 84 tightly together.

In order to create an explosion-proof barrier between the surfaces 82, 84, those surfaces 82, 84 could be ground and polished to a smooth flat finish. Alternatively, those surfaces could be provided with grooves and serrations, e.g., concentric circular serrations, which mate when the surfaces are clamped together.

All of the earlier discussed advantages realized by the apparatus of FIGS. 2–4 are also realized by the apparatus of FIGS. 5–6. Also, the apparatus of FIGS. 5–6 enables the sleeve sections to be installed separately.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. An explosion-proof fitting assembly for electrically interconnecting electrical components mounted in first and second adjacently disposed enclosures, respectively, said fitting assembly comprising:

a feedthrough bushing having an external screw thread adapted to secure the feedthrough bushing with respect to the enclosures, said feedthrough bushing including a longitudinal through-passage having an internal screw thread;

a feedthrough seal member having an external screw thread secured in said internal screw thread, permitting said feedthrough bushing to move longitudinally along said feedthrough seal member, said feedthrough seal member including a longitudinal through-passage;

a plurality of electrical conductors extending through said through-passage of said feedthrough seal member and being embedded within sealing compound occupying said through-passage of said feedthrough seal member; and a spacer element mounted in at least one end of said through-passage of said feedthrough seal member, said conductors extending through holes formed in said spacer element.

2. A fitting assembly according to claim 1, wherein there are spacer elements disposed at both ends of said through-passage of said feedthrough seal.

3. An explosion-proof fitting according to claim 1, wherein said feedthrough bushing includes a radially outwardly projecting flange at one end thereof.

4. An explosion-proof electrical apparatus comprising:

first and second adjacently disposed enclosures;

electrical devices mounted in respective ones of said enclosures, each enclosure having an internal screw-threaded hole, said holes being aligned with one another;

sleeve means having external first and second screw threads disposed at first and second ends thereof and adapted to be secured in respective ones of said holes, said sleeve means including a first longitudinal through-passage having first and second ends corresponding to said first and second ends, respectively, of said sleeve means, said first end of said first through-passage having an internal third screw thread;

a feedthrough bushing mounted in said first through-passage and having an external fourth screw thread secured in said third screw thread, said feedthrough bushing including a second longitudinal through-passage having first and second ends, said first end of said second through-passage being disposed adjacent said first end of said first through-passage and having an internal fifth screw thread;

a feedthrough seal member mounted in said second through-passage and including a third longitudinal through-passage, said third through-passage having first and second ends, said first end of said third through-passage being disposed adjacent said first end of said second through-passage and having an external sixth screw thread secured in said fifth screw thread; and a plurality of electrical conductors extending through said third through-passage and embedded within sealing compound occupying said third through-passage.

5. An explosion-proof fitting assembly according to claim 4 including an internally threaded nut mounted on said second screw thread and bearing against an internal surface of said second enclosure.

6. An explosion-proof fitting assembly according to claim 4, wherein said sleeve means comprises a one-piece sleeve.

7. An explosion-proof fitting assembly according to claim 4, wherein said sleeve means comprises first and second sleeve sections forming said first and second ends of said sleeve means, respectively, and further comprising a clamping member clamping said sleeve sections longitudinally together.

8. A method of installing an explosion-proof fitting assembly for electrically interconnecting two electrical devices disposed, respectively, in two enclosures, each enclosure having an internally threaded hole which is threadedly connected to a respective end of a hollow sleeve means, said method comprising the steps of:

A) providing said fitting assembly in the form of a feedthrough seal member threadedly mounted within a feedthrough bushing, said feedthrough seal member carrying a plurality of electrical conductors which extend therethrough and which are embedded in sealing compound occupying said feedthrough seal member, B) positioning said fitting assembly such that at least a portion of said feedthrough seal member is disposed within said sleeve means and said conductors extend through said sleeve means, and C) screwing said feedthrough bushing along said feedthrough seal member while holding said feedthrough seal member stationary to simultaneously screw said feedthrough bushing into said sleeve means.

9. A method according to claim 8, including the step of securing a nut onto an end of said sleeve means opposite an end thereof at which said fitting is disposed, said nut bearing against an inside surface of a respective enclosure.

10. A method according to claim 8, wherein said sleeve means comprises a one-piece sleeve body and including, prior to step B, the step of simultaneously threading said ends of said sleeve body into said holes.

11. A method according to claim 8, wherein said sleeve means comprises two sections, and including, prior to step B, the step of separately screwing said two sections of said sleeve means into said holes, and clamping said sleeve sections together.

12. A method according to claim 11, wherein said clamping step comprises threading a clamping ring to one of said sleeve sections and rotating said clamping ring to urge said sleeve sections together.

13. An explosion-proof fitting assembly for electrically interconnecting electrical components mounted in first and second adjacently disposed enclosures, respectively, said fitting assembly comprising:

a feedthrough bushing having an external screw thread adapted to secure the feedthrough bushing with respect to the enclosures, said feedthrough bushing including a longitudinal through-passage having an internal screw thread;

a feedthrough seal member having an external screw thread secured in said internal screw thread, permitting said feedthrough bushing to move longitudinally along said feedthrough seal member, said feedthrough seal member including a longitudinal through-passage;

a plurality of electrical conductors extending through said through-passage of said feedthrough seal member and being embedded within sealing compound occupying said through-passage of said feedthrough seal member; and a hollow sleeve structure in which said feedthrough bushing is mounted, said sleeve structure having an internal screw thread in which said external screw thread of said feedthrough bushing is secured, said sleeve structure including external screw threads at opposite ends thereof adapting said sleeve structure for threaded connection with respective enclosures.

14. An explosion-proof fitting according to claim 13, wherein said feedthrough bushing includes a radially outwardly projecting flange for abutting an end of said sleeve structure to limit the extent of longitudinal movement of said feedthrough bushing into said sleeve structure.

15. An explosion-proof fitting according to claim 13, wherein said sleeve structure comprises a one-piece sleeve having both of said external screw threads of said sleeve structure.

16. An explosion-proof fitting according to claim 13, wherein said sleeve structure comprises first and second interconnected sleeve sections on which respective ones of said external screw threads of said sleeve structure are disposed.

17. A fitting assembly according to claim 13, further comprising a spacer element mounted in at least one end of said through-passage of said feedthrough seal member, said conductors extending through holes formed in said spacer element.

* * * * *